US011831231B2

(12) United States Patent
Summanen et al.

(10) Patent No.: US 11,831,231 B2
(45) Date of Patent: Nov. 28, 2023

(54) METHOD AND A CONTROL DEVICE FOR CONTROLLING A POWER CONVERTER CONFIGURED TO FORM A FREQUENCY DROOP VALUE BASED ON ELECTRIC POWER SUPPLIED TO ALTERNATING CURRENT SYSTEM

(71) Applicant: Danfoss Editron Oy, Lappeenranta (FI)

(72) Inventors: Antti Summanen, Lappeenranta (FI); Antti Tarkiainen, Lappeenranta (FI)

(73) Assignee: Danfoss Editron Oy, Lappeenranta (FI)

( * ) Notice: Subject to any disclaimer, the term of this patent is extended or adjusted under 35 U.S.C. 154(b) by 294 days.

(21) Appl. No.: 17/182,612

(22) Filed: Feb. 23, 2021

(65) Prior Publication Data
US 2021/0265906 A1    Aug. 26, 2021

(30) Foreign Application Priority Data

Feb. 24, 2020 (EP) .................................. 20159044

(51) Int. Cl.
*H02M 1/00* (2006.01)
*G05B 6/02* (2006.01)
*H02J 13/00* (2006.01)

(52) U.S. Cl.
CPC .............. *H02M 1/00* (2013.01); *G05B 6/02* (2013.01); *H02J 13/00002* (2020.01); *H02M 1/0025* (2021.05)

(58) Field of Classification Search
CPC ........ H02J 3/00; H02J 3/34; H02J 3/36; H02J 3/381; H02J 3/46; H02J 3/38; H02J 3/24;
(Continued)

(56) References Cited

U.S. PATENT DOCUMENTS 5,798,633 A * 8/1998 Larsen ...................... H02J 3/38
                                                       323/207
10,749,446 B2 * 8/2020 Gong ........................ H02J 3/38
(Continued)

FOREIGN PATENT DOCUMENTS

CN    109980682 A    7/2019
CN    107453412 B    11/2019

OTHER PUBLICATIONS

Hangyi Cai, et al., "The novel droop control strategy for low voltage microgrid without matching line impedance," 2017 IEEE Conference on Energy Internet and Energy System Integration (EI2), IEEE, Nov. 26, 2017, pp. 1-6, XP033288497, DOI: 10.1109/EI2. 2017.8245760.
(Continued)

*Primary Examiner* — Thienvu V Tran
*Assistant Examiner* — Nusrat Quddus
(74) *Attorney, Agent, or Firm* — McCormick, Paulding & Huber PLLC

(57) ABSTRACT

A control device (101) for controlling a power converter (109) is configured to form a frequency droop value based on electric power supplied by the power converter to an alternating current system, decrease a frequency control value by the frequency droop value, form a power control value based on a target value of the electric power, increase the frequency control value by the power control value, and supply the frequency control value to the power converter to control alternating voltage frequency of the power converter. The electric power is driven to a value at which a combined effect of the frequency droop value and the power control value makes the alternating voltage frequency of the power converter to be the same as operating frequency of the alternating current system. Thus, the electric power can be controlled by changing the power control value.

15 Claims, 3 Drawing Sheets

(58) Field of Classification Search
CPC .......... H02J 3/40; H02J 300/10; H02J 310/10; H02J 9/066; H02J 9/08; H02J 2001/104; H02J 2203/20; H02J 3/01; H02M 1/00; H02M 2001/0003; H02M 7/48; H02M 3/1582; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 5/40; H02M 5/42; H02M 5/453; H02M 7/7575; H02M 5/458; H02M 5/45; H02M 5/4585; H02M 5/4505; H02M 5/451; H02M 5/452; H02M 5/447; H02M 5/456; H02M 1/12; H02M 1/4266; H02M 2001/123; H02M 3/073; H02M 3/10; H02M 3/135; H02M 3/137; H02M 3/28; H02M 3/315; H02M 3/3155; H02M 3/325; H02M 3/335; H02M 7/515; H02M 7/521; H02M 7/53; H02M 7/537; H02M 7/5383; H02M 7/53862; H02M 7/757; H02M 7/79; H02M 3/337; H02M 3/338; H02M 3/3382; H02M 3/3384; H02M 7/538; H02M 7/53832; H02M 7/53835; H02M 7/487; H02M 7/539; H02M 7/23; H02M 7/21; H02M 7/12; H02M 7/04; H02M 7/00; H02P 9/14; H02P 9/44; H02P 9/02; H02H 7/261; H02H 7/268

USPC .......................................................... 307/43

See application file for complete search history.

(56) References Cited

U.S. PATENT DOCUMENTS

| | | | | |
|---|---|---|---|---|
| 11,146,193 | B2* | 10/2021 | Manson | F02B 63/04 |
| 2009/0134714 | A1* | 5/2009 | Tarkiainen | H02J 3/01 |
| | | | | 307/105 |
| 2009/0279328 | A1* | 11/2009 | Jiang-Hafner | H02M 7/797 |
| | | | | 363/35 |
| 2009/0326724 | A1* | 12/2009 | Lasseter | H02J 3/381 |
| | | | | 700/297 |
| 2012/0259477 | A1* | 10/2012 | Abido | H02J 3/38 |
| | | | | 700/297 |
| 2013/0051103 | A1* | 2/2013 | Roscoe | H02M 7/53875 |
| | | | | 363/131 |
| 2013/0073109 | A1* | 3/2013 | Cheng | H02J 3/40 |
| | | | | 700/298 |
| 2013/0294119 | A1* | 11/2013 | Kimura | H02J 3/381 |
| | | | | 363/40 |
| 2014/0049228 | A1* | 2/2014 | Rodriguez Cortes | H02P 9/00 |
| | | | | 322/24 |
| 2014/0152110 | A1* | 6/2014 | Sugimoto | H02J 3/381 |
| | | | | 307/66 |
| 2015/0357820 | A1* | 12/2015 | Sugimoto | H02M 7/04 |
| | | | | 307/52 |
| 2016/0248253 | A1* | 8/2016 | Zimmanck | H02J 3/388 |
| 2017/0005473 | A1* | 1/2017 | Somani | H02J 3/381 |
| 2018/0262009 | A1* | 9/2018 | Sun | H02J 3/38 |
| 2018/0269819 | A1* | 9/2018 | Tuckey | H02P 9/02 |
| 2018/0348712 | A1* | 12/2018 | Zhong | G01R 15/142 |
| 2018/0358907 | A1 | 12/2018 | Kato et al. | |
| 2019/0103743 | A1* | 4/2019 | Sun | H02J 13/00004 |
| 2019/0207391 | A1* | 7/2019 | Fazeli | H02J 3/381 |
| 2020/0321783 | A1* | 10/2020 | Corradin | H02J 13/00002 |
| 2020/0389100 | A1* | 12/2020 | Izumi | H02J 3/1821 |
| 2021/0111651 | A1* | 4/2021 | Manson | H02J 3/46 |
| 2021/0111652 | A1* | 4/2021 | Schweitzer, III | H02J 3/241 |
| 2021/0226452 | A1* | 7/2021 | Biris | F03D 7/0284 |
| 2021/0257839 | A1* | 8/2021 | Kato | H02J 3/241 |
| 2022/0052623 | A1* | 2/2022 | Ou | H02J 3/24 |
| 2022/0077688 | A1* | 3/2022 | Patarroyo | H02J 3/46 |

OTHER PUBLICATIONS

Fredrik Gothner, "Microgrids: What are they, virtual impedance and a control concept for inverters in islanded microgrids—#SINTEFblog," Apr. 10, 2019, XP055902275, URL: https://blog.sintef.com/sitefengergy/electric-power-components/microgrids-what-are-they-virtual-impendance-and-a-control-concept-for-inverters-in-islanded-microgrids/.

Jinghang Lu, et al., "Virtual resistance-based control strategy for DC link regeneration protection and current sharing in uninterruptible power supply," 2017 IEEE Energy Conversion Congress and Exposition (ECCE), IEEE, Oct. 1, 2017, pp. 4481-4487, XP033247412, DOI: 10/1109/ECCE.2017.8096769.

Communication for European Patent Application No. 20159044.5 dated Mar. 23, 2022.

Geng Yiwen, et al., "A Modified Droop Control for Grid-Connected Inverters with Improved Stability in the Fluctuation of Grid Frequency and Voltage Magnitude", IEEE Access, vol. 7, pp. 75658-75669, published May 31, 2019, DOI: 10.1109/ACCESS.2019.2920312.

Shalini Raosaheb Borade, et al., "Analysis of Voltage-Frequency (VF) Droop Control Method for AC Microgrid Application", International Journal of Advance Research in Science and Engineering, vol. No. 7, Issue No. 2, Feb. 2018, URL: https://www.ijarse.com/images/fullpdf/1518687068_MCCIA3056_IJARSE.pdf.

Communication for European Patent Application No. 20159044.5 dated Mar. 7, 2021.

Carniato, L.A., et al., "Power flow optimization for grid connected inverter using evolutionary algorithm and additional control loop", Power Electronics Conference (COBEP), 2011 Brazilian, IEEE, Sep. 11, 2011 (Sep. 11, 2011), pp. 422-427, XP031999391, DOI: 10.1109/COBEP.2011.6085285, ISBN: 978-1-4577-1644-7.

Examination for Oral Proceedings for European Application No. 20 159 044.5, dated Apr. 28, 2023.

* cited by examiner

METHOD AND A CONTROL DEVICE FOR CONTROLLING A POWER CONVERTER CONFIGURED TO FORM A FREQUENCY DROOP VALUE BASED ON ELECTRIC POWER SUPPLIED TO ALTERNATING CURRENT SYSTEM

CROSS REFERENCE TO RELATED APPLICATION

This application claims foreign priority benefits under 35 U.S.C. § 119 to European Patent Application No. 20159044.5 filed on Feb. 24, 2020, the content of which is hereby incorporated by reference in its entirety.

TECHNICAL FIELD

The disclosure relates generally to control of a power converter constituting a part of an alternating current system e.g. a microgrid. More particularly, the disclosure relates to a control device and to a method for controlling a power converter. Furthermore, the disclosure relates to a computer program for controlling a power converter.

BACKGROUND

In many cases, an alternating current "AC" system, such as e.g. a microgrid, is supplied with a power converter for converting direct voltage into one or more alternating voltages e.g. into three-phase alternating voltage. An AC system of the kind mentioned above can be connected in parallel with another AC system that can be for example a utility grid or an AC system supplied with one or more power converters and/or one or more gensets each employing a generator driven by a combustion engine, a wind turbine, a hydro turbine, or some other prime mover.

A common objective when running an AC system, such as e.g. a microgrid, in parallel with another AC system is to share a load between the AC systems. For example, in a case where a microgrid is synchronized and connected to a utility grid, a desired operation can be such that the utility grid feeds all consumed electric power and the microgrid operates in parallel with zero power but is ready to take on load if the utility grid is disconnected. For another example, a battery can be connected to a direct voltage side of a power converter of a microgrid and the battery is charged when the microgrid is connected to the utility grid. To charge the battery, the power converter draws electric power from the utility grid and feeds that to the battery. In both the above-mentioned example cases, the electric power of the power converter of the microgrid needs to be controlled.

A traditional solution is to employ active front-end "AFE" control, which means that phase currents of a power converter are controlled using a feedback control. Power control can be achieved through the current control. However, when the phase currents are controlled the phase voltages are not controlled but the phase voltages assume values that are required to force the phase currents to target values. This is opposite to the microgrid control objective, which is to generate controlled sinusoidal voltages and let loads determine the currents. Thus, to employ the AFE control in a microgrid run in parallel with a utility grid means a need to use the AFE control when the utility grid is connected and to switch to voltage control when the utility grid is disconnected and a power converter of the microgrid needs to generate desired sinusoidal voltages. Implementing both the AFE control and the voltage control increases however complexity and costs. Furthermore, it is challenging to implement a switchover between the AFE control and the voltage control so that voltages continue smoothly during the switchover. For example, the switchover may require stopping of modulation in the power converter of the microgrid. If the utility grid is not connected when the modulation is stopped, the microgrid experiences a black out situation. A requirement that the modulation is not stopped means that a switchover process should be carried out in a short time frame, e.g. about 100 microseconds. The control mode that is being switched on needs to be initialized so that the voltages smoothly continue when the previous control mode leaves them. This requirement increases complexity and sets considerable requirements to computation resources. Furthermore, in order the switchover to occur at correct time, a disconnection or connection of the utility grid needs to be sensed. This may be challenging in cases where another party is operating a contactor connecting and disconnecting the microgrid and the utility grid. Furthermore, a disconnection can be unintentional and thus instantaneous microgrid operation is needed to prevent a black out situation. In cases of the kind mentioned above, determination of a correct switchover time becomes a critical factor.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new control device for controlling a power converter that can be e.g. a power converter constituting a part of an alternating current "AC" microgrid.

A control device according to the invention comprises a data processing system configured to:
- form a frequency droop value based on data indicative of electric power of the power converter, and
- change a frequency control value by the frequency droop value, the frequency droop value decreasing the frequency control value when a power flow direction is outwards from alternating voltage terminals of the power converter,
- form a power control value based on data indicative of a target value of the electric power,
- change the frequency control value by the power control value, the power control value increasing the frequency control value when the target value of the electric power corresponds to the power flow direction outwards from the alternating voltage terminals of the power converter, and
- deliver the frequency control value to the power converter so as to control alternating voltage frequency of the power converter.

The dependence of the frequency control value on the frequency droop value constitutes a drooping feedback from the electric power of the power converter to the alternating voltage frequency of the power converter. Electric power supplied by the power converter to an alternating current "AC" system, e.g. a parallel connection of an AC microgrid and an AC utility grid, increases when the alternating voltage frequency of the power converter is greater than operating frequency of the AC system because this frequency difference increases a power angle between the power converter and the AC system. In this exemplifying case, the above-mentioned drooping feedback decreases the alternating voltage frequency of the power converter, which in turn reduces the electric power. Correspondingly, the electric power supplied by the power converter to the AC system decreases when the alternating voltage frequency of the power converter is less than the operating frequency of the AC system because this frequency difference decreases the above-mentioned power angle. In this case, the above-mentioned drooping feedback increases the alternating voltage frequency of the power converter, which increases the electric power.

As a corollary of the above-described drooping feedback, the electric power is driven to a value at which a combined effect of the drooping feedback and the above-mentioned power control value makes the alternating voltage frequency of the power converter to be the same as the operating frequency of the AC system. Thus, the electric power can be controlled by changing the power control value in order to drive the electric power to its target value. If, for example, the power control value is stepwise increased, the alternating voltage frequency of the power converter gets greater than the operating frequency of the AC system and thus the power angle and thereby the electric power supplied to the AC system start to increase. As a corollary of the increasing electric power, the drooping feedback starts to decrease the alternating voltage frequency of the power converter until the alternating voltage frequency of the power converter gets equal to the operating frequency of the AC system and thereby the power angle stops increasing. The end-value of the power angle is greater than its value at a time instant of the stepwise increase of the power control value. Thus, in the above-described exemplifying case, the electric power is increased by an amount corresponding to the stepwise increase of the power control value. Furthermore, the drooping feedback makes it possible for the power converter to adapt to variations of the operating frequency of the AC system.

In this document, the term "electric power" means active power in conjunction with AC systems, i.e. not reactive power nor apparent power. The term "electric power" is used because this term is applicable in conjunction with both AC systems and direct current "DC" systems.

In accordance with the invention, there is provided also a new power converter that comprises:
- a converter stage configured to form one or more alternating voltages, and
- a driver stage configured to control the converter stage to form the one or more alternating voltages in accordance with a frequency control value expressing frequency of the one or more alternating voltages, and
- a control device according to the invention and configured to determine the frequency control value.

In accordance with the invention, there is provided also a new method for controlling a power converter. A method according to the invention comprises:
- forming a frequency droop value based on data indicative of electric power of the power converter, and
- changing a frequency control value by the frequency droop value, the frequency droop value decreasing the frequency control value when a power flow direction is outwards from alternating voltage terminals of the power converter,
- forming a power control value based on data indicative of a target value of the electric power,
- changing the frequency control value by the power control value, the power control value increasing the frequency control value when the target value of the electric power corresponds to the power flow direction outwards from the alternating voltage terminals of the power converter, and
- delivering the frequency control value to the power converter so as to control alternating voltage frequency of the power converter.

In accordance with the invention, there is provided also a new computer program for controlling a power converter. A computer program according to the invention comprises computer executable instructions for controlling a programmable processing system to:
- form a frequency droop value based on data indicative of electric power of the power converter, and
- change a frequency control value by the frequency droop value, the frequency droop value decreasing the frequency control value when a power flow direction is outwards from alternating voltage terminals of the power converter,
- form a power control value based on data indicative of a target value of the electric power,
- change the frequency control value by the power control value, the power control value increasing the frequency control value when the target value of the electric power corresponds to the power flow direction outwards from the alternating voltage terminals of the power converter, and
- deliver the frequency control value to the power converter so as to control alternating voltage frequency of the power converter.

In accordance with the invention, there is provided also a new computer program product. The computer program product comprises a non-volatile computer readable medium, e.g. a compact disc "CD", encoded with a computer program according to the invention.

Various exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DETAILED DESCRIPTION

The specific examples provided in the description below should not be construed as limiting the scope and/or the applicability of the accompanied claims. Lists and groups of examples provided in the description are not exhaustive unless otherwise explicitly stated.

Figure 1A:
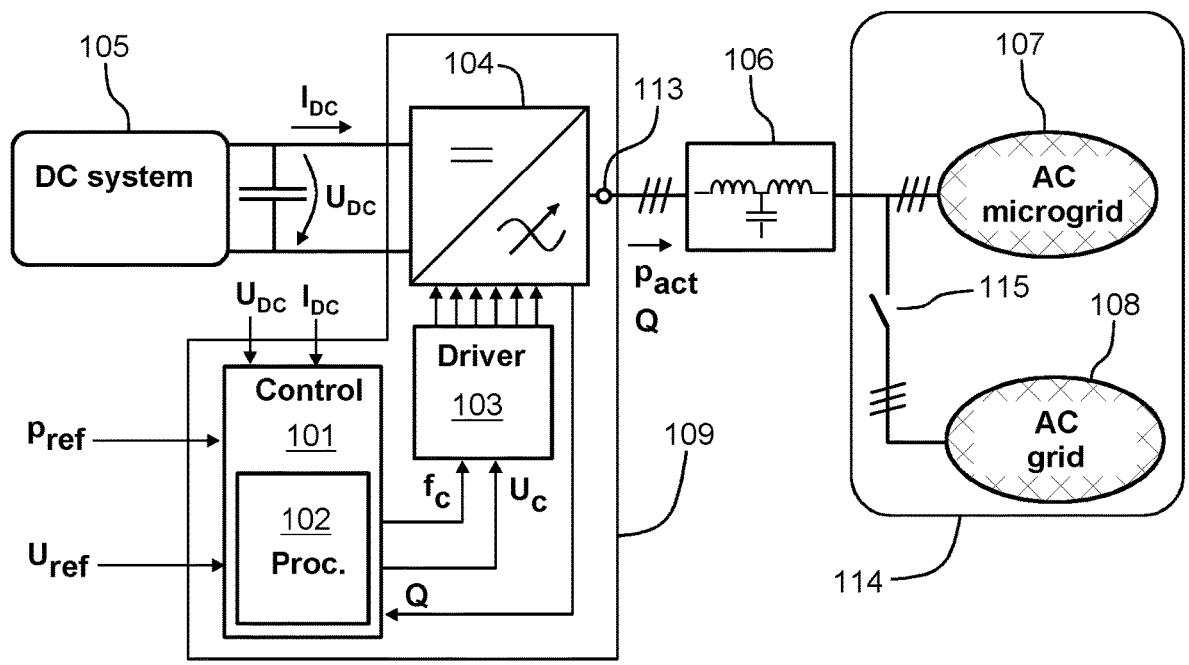
FIG. 1a illustrates a power converter according to an exemplifying and non-limiting embodiment.

FIG. 1a shows a high-level block diagram of a power converter 109 according to an exemplifying and non-limiting embodiment. In the exemplifying case presented in FIG. 1, the power converter 109 is configured to transfer electric power between a direct current "DC" system 105 and an alternating current "AC" system 114 via a line filter 106 that can be for example an inductor-capacitor-inductor "LCL" filter. In this exemplifying case, the AC system 114 comprises an AC microgrid 107 and another AC grid 108 that can be e.g. an AC utility grid. The AC microgrid 107 and the AC grid 108 are parallel connected via a circuit breaker 115. The DC system 105 can be for example such that it sometimes supplies electric power to the power converter 109 i.e. $U_{DC} \times I_{DC} > 0$, but sometimes it receives electric power from the power converter 109 i.e. $U_{DC} \times I_{DC} < 0$, and sometimes there is no electric power transfer between the DC system 105 and the power converter 109 i.e. $U_{DC} \times I_{DC} = 0$. The DC system 105 may comprise for example a fuel cell and/or a photovoltaic panel and/or a battery system and/or a capacitor system, where the battery and/or capacitor system is sometimes charged and sometimes discharged.

The power converter 109 comprises a converter stage 104 configured to convert the direct voltage $U_{DC}$ into alternating voltages. In this exemplifying case, the power converter 109 is configured to convert the direct voltage $U_{DC}$ into three-phase alternating voltage. It is however also possible that the number of phases is less than three or greater than three. The converter stage 104 can be e.g. an inverter bridge implemented with controllable semiconductor components such as e.g. insulated gate bipolar transistors "IGBT" or gate turn off "GTO" thyristors, and possibly with diodes that are antiparallel with the controllable semiconductor components. The power converter 109 comprises a driver stage 103 configured to control the converter stage 104 to form the three-phase alternating voltage in accordance with a frequency control value $f_c$ expressing frequency of the three-phase alternating voltage. In this exemplifying power converter 109, the driver stage 103 is configured to control the converter stage 104 also in accordance with a voltage control value $U_c$ that expresses an amplitude of the three-phase alternating voltage. The three-phase alternating voltage can be produced e.g. by forming phase voltage references and running pulse width modulation "PWM" in accordance with the phase voltage references. The PWM results in phase voltages that constitute the three-phase alternating voltage. There are also other techniques to form the three-phase alternating voltage using PWM, e.g. space-vector modulation.

Figure 1B:
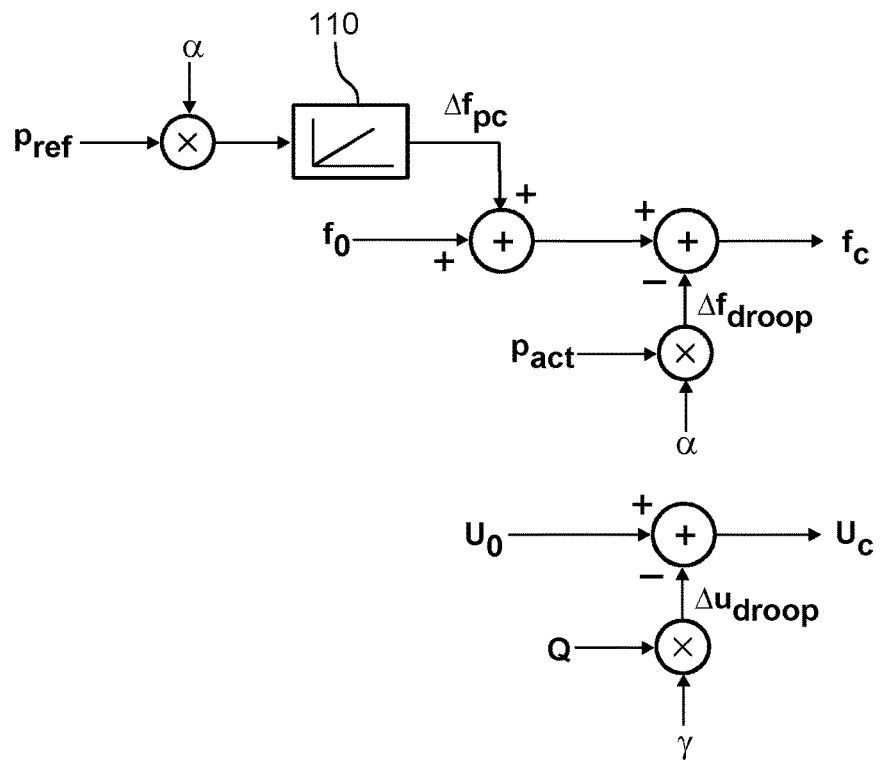
FIG. 1b illustrates a control device according to an exemplifying and non-limiting embodiment.

The power converter 109 comprises a control device 101 according to an exemplifying and non-limiting embodiment for determining the above-mentioned frequency control value $f_c$. In this exemplifying case, the control device 101 is configured to determine the above-mentioned voltage control value $U_c$, too. A signal diagram of the control device 101 is shown in FIG. 1b. The control device 101 comprises a data processing system 102 configured to form a frequency droop value $\Delta f_{droop}$ based on data indicative of actual electric power $p_{act}$ of the power converter 109. The data processing system 102 is configured to change the frequency control value $f_c$ by the frequency droop value $\Delta f_{droop}$ so that the frequency droop value decreases the frequency control value $f_c$ when a power flow direction is outwards from alternating voltage terminals 113 of the power converter 109 i.e. the power flow direction is from the power converter 109 to the AC system 114. Correspondingly, the frequency droop value $\Delta f_{droop}$ increases the frequency control value $f_c$ when the power flow direction is from the AC system 114 to the power converter 109. The dependence of the frequency control value $f_c$ on the frequency droop value $\Delta f_{droop}$ constitutes a drooping feedback from the electric power $p_{act}$ of the power converter 109 to the alternating voltage frequency of the power converter 109. The electric power $p_{act}$ increases when the alternating voltage frequency of the power converter 109 is greater than operating frequency of the AC system 114 because this frequency difference increases a power angle between the power converter 109 and the AC system 114. In this exemplifying situation, the above-mentioned drooping feedback decreases the alternating voltage frequency of the power converter 109, which in turn reduces the electric power $p_{act}$. Correspondingly, the electric power $p_{act}$ decreases when the alternating voltage frequency of the power converter is less than the operating frequency of the AC system 114 because this frequency difference decreases the above-mentioned power angle. In this exemplifying situation, the above-mentioned drooping feedback increases the alternating voltage frequency of the power converter 109, which in turn increases the electric power $p_{act}$.

The data processing system 102 is configured to form a power control value $\Delta f_{pc}$ based on data indicative of a target value $p_{ref}$ of the electric power of the power converter 109. The data processing system 102 is configured to change the frequency control value $f_c$ by the power control value $\Delta f_{pc}$ so that the power control value increases the frequency control value when the target value $p_{ref}$ corresponds to the power flow direction outwards from the alternating voltage terminals 113 of the power converter i.e. the power flow direction from the power converter 109 to the AC system 114. Correspondingly, the power control value $\Delta f_{pc}$ decreases the frequency control value $f_c$ when the target value $p_{ref}$ corresponds to the power flow direction from the AC system 114 to the power converter 109. The data processing system 102 is configured to deliver the frequency control value $f_c$ to the driver stage 103 so as to control the alternating voltage frequency of the power converter 109.

As a corollary of the above-described drooping feedback, the electric power $p_{act}$ is driven to a value at which a combined effect of the drooping feedback and the above-mentioned power control value $\Delta f_{pc}$ makes the alternating voltage frequency of the power converter 109 to be the same as the operating frequency of the AC system 114. Thus, the electric power $p_{act}$ can be controlled by changing the power control value $\Delta f_{pc}$ in order to drive the electric power $p_{act}$ to its target value $p_{ref}$. If, for example, the power control value $\Delta f_{pc}$ is increased by a stepwise increment $d\Delta f_{pc}$, the alternating voltage frequency of the power converter 109 gets greater than the operating frequency of the AC system 114 and thus the power angle and thereby the electric power $p_{act}$ start to increase. As a corollary of the increasing electric power $p_{act}$, the drooping feedback starts to decrease the alternating voltage frequency of the power converter 109 until the alternating voltage frequency of the power converter 109 gets equal to the operating frequency of the AC system 114 and thereby the power angle stops increasing.

The end-value of the power angle is greater than its value at a time instant of the stepwise increase of the power control value. Thus, in the above-described exemplifying case, the electric power $p_{act}$ is increased by an amount corresponding to the stepwise increment $d\Delta f_{pc}$ of the power control value.

In a control device according to an exemplifying and non-limiting embodiment, the data processing system 102 is configured to form the frequency control value $f_c$ according to the following formulas:

$$f_c = f_0 - \Delta f_{droop} + \Delta f_{pc}, \tag{1}$$

$$\Delta f_{droop} = \alpha p_{act}, \text{ and} \tag{2}$$

$$\Delta f_{pc} = \alpha p_{ref}, \tag{3}$$

where $f_0$ is a base value of the frequency control value, and $\alpha$ is a drooping coefficient for changing the frequency control value $f_c$ in accordance with the electric power $p_{act}$. The base value $f_0$ can be set, for example, as close as possible to the operating frequency of the AC system 114. The drooping coefficient $\alpha$ can be for example:

$$\alpha = k_{droop} f_{nom} / p_{nom}, \tag{4}$$

where $k_{droop}$ is a drooping rate coefficient, $f_{nom}$ is a nominal operating frequency of the AC system 114, and $p_{nom}$ is a nominal electric power of the power converter 109. The drooping rate coefficient $k_{droop}$ can be for example in the range from 0.01 to 0.1, e.g. 0.04.

The above-presented formulas 1-3 manifest that in a steady state the actual electric power $p_{act}$ is equal to the target value $p_{ref}$ if the base value $f_0$ is the operating frequency of the AC system 114 because, in the steady state, the alternating voltage frequency of the power converter 109 must be equal to the operating frequency of the AC system 114, i.e. $f_c$ must be equal to $f_0$. Therefore, based on the formula 1, $\Delta f_{droop}$ must be equal to $\Delta f_{pc}$, which yields $p_{act}=p_{ref}$.

In a control device according to an exemplifying and non-limiting embodiment, the data processing system 102 is configured to limit a rate of change of the power control value $\Delta f_{pc}$ i.e. $d\Delta f_{pc}/dt$, to be at most a predetermined upper limit. In FIG. 1b, the limitation of the rate of change is depicted with a ramping block 110. The limitation of the rate of change can be advantageous for example when the AC microgrid 107 is started from a black-out situation.

Without limiting the generality, we can consider an exemplifying situation in which the circuit breaker 115 is closed i.e. the AC microgrid 107 and the AC grid 108 are parallel connected, the electric power $p_{act}$ of the power converter 109 is e.g. zero and the electric power supplied by the AC grid 108 to the AC microgrid 107 is the nominal power $p_{nom}$ of the power converter 109. The target value $p_{ref}$ is assumed to be zero. Next, we assume that the operating frequency of the AC grid 108 changes by $\Delta f$. The change $\Delta f$ causes a change in the electric power $p_{act}$ of the power converter 109 because the change $\Delta f$ causes a frequency difference between the power converter 109 and the AC system 114. In a new equilibrium point, the alternating voltage frequency of the power converter 109 has changed by the $\Delta f$ and the electric power $p_{act}$ is $-\Delta f/\alpha$. The electric power $p_{act}$ can be returned back to zero by adjusting the target value $p_{ref}$ to be $\Delta f/\alpha$. Thus, the above-described power control can be used for keeping the electric power $p_{act}$ of the power converter 109 at a desired value when the operating frequency of the AC grid 108 changes.

For another example, we assume that the circuit breaker 115 is suddenly opened when the operating frequency of the AC grid 108 is the nominal operating frequency $f_{nom}$, the AC grid 108 supplies electric power $p_{load}$ to the AC microgrid 107, the electric power $p_{act}$ of the power converter 109 is zero, and the target value $p_{ref}$ is zero. In the above-described exemplifying situation, the AC microgrid 107 starts to draw electric power from the power converter 109, i.e. the operation of the power converter 109 resembles an uninterruptible power supply "UPS" operation. The drooping feedback causes that the alternating voltage frequency of the power converter 109 drops by $\alpha p_{load}$. If the drooping rate coefficient $k_{droop}$ is e.g. 0.04, the alternating voltage frequency of the power converter 109 drops by $4\% \times p_{load}/p_{nom}$. The alternating voltage frequency of the power converter 109 can be returned back to the $f_{nom}$ by adjusting the $p_{ref}$ to be the $p_{load}$.

In a control device according to an exemplifying and non-limiting embodiment, the data processing system 102 is configured to form a voltage droop value $\Delta u_{droop}$ based on data indicative of reactive power Q of the power converter 109. The data processing system 102 is configured to change the voltage control value $U_c$ so that the voltage droop value decreases the amplitude of the three-phase voltage of the power converter 109 in response to a situation in which the power converter 109 produces inductive reactive power i.e. consumes capacitive reactive power. Correspondingly, the voltage droop value increases the amplitude of the three-phase voltage in response to a situation in which the power converter 109 consumes inductive reactive power. The above-described voltage drooping facilitates a control of the reactive power. For example, in a case where two power converters are connected to a same AC grid, the voltage drooping is a tool for sharing reactive power between these power converters.

In a control device according to an exemplifying and non-limiting embodiment, the data processing system 102 is configured to form the voltage control value $U_c$ according to the following formulas:

$$U_c = U_0 - \Delta u_{droop}, \text{ and} \tag{5}$$

$$\Delta u_{droop} = \gamma Q, \tag{6}$$

where $U_0$ is a base value of the voltage control value and $\gamma$ is a voltage drooping coefficient for changing the voltage control value $U_c$ in accordance with the reactive power Q. The reactive power Q is positive when the power converter 109 produces inductive reactive power. The base value $U_0$ can be set to be for example the nominal voltage of the AC system 114.

In the exemplifying case illustrated in FIGS. 1a and 1b, the data indicative of the actual electric power $p_{act}$ comprises measured or estimated values of the direct voltage $U_{DC}$ and the direct current $I_{DC}$. The actual electric power $p_{act}$ can be estimated as $U_{DC} \times I_{DC}$ if losses in the converter stage 104 can be deemed to be negligible. In an exemplifying case in which the direct voltage $U_{DC}$ is kept substantially constant, it may suffice that the data indicative of the electric power comprises the measured or estimated value of the direct current $I_{DC}$ only. It is also possible that the data indicative of the electric power comprises a measured or estimated value of active current at the alternating voltage terminals 113 of the power converter 109 and a measured or estimated amplitude of the three-phase alternating voltage produced by the power converter 109. In an exemplifying case in which the amplitude of the three-phase alternating voltage is kept substantially constant, it may suffice that the data indicative of the electric power comprises the measured or estimated value of the active current only. Thus, it is possible that actual and target values of the active current are used instead of the actual and target values $p_{act}$ and $p_{ref}$ of the electric power.

As illustrated by the above-presented formulas 1-3, the actual electric power $p_{act}$ of the power converter 109 is equal to the target value $p_{ref}$ in a steady state if the base value $f_0$ equals the operating frequency of the AC system 114. In practice, the operating frequency of the AC system 114 may vary and thus the base value $f_0$ may differ from the operating frequency of the AC system 114. In this case, the actual electric power $p_{act}$ is driven to a value such that the difference between the actual electric power $p_{act}$ and the target value $p_{ref}$ compensates for the difference between the base value $f_0$ and the real operating frequency of the AC system 114. This situation can be handled e.g. by adjusting the target value $p_{ref}$ so that the actual electric power $p_{act}$ reaches its desired value. It is also possible to form a correction value which is added to the frequency control value $f_c$ and which compensates for the difference between the base value $f_0$ and the real operating frequency of the AC system 114 so that the actual electric power $p_{act}$ does not need to differ from the target value $p_{ref}$.

Figure 1C:
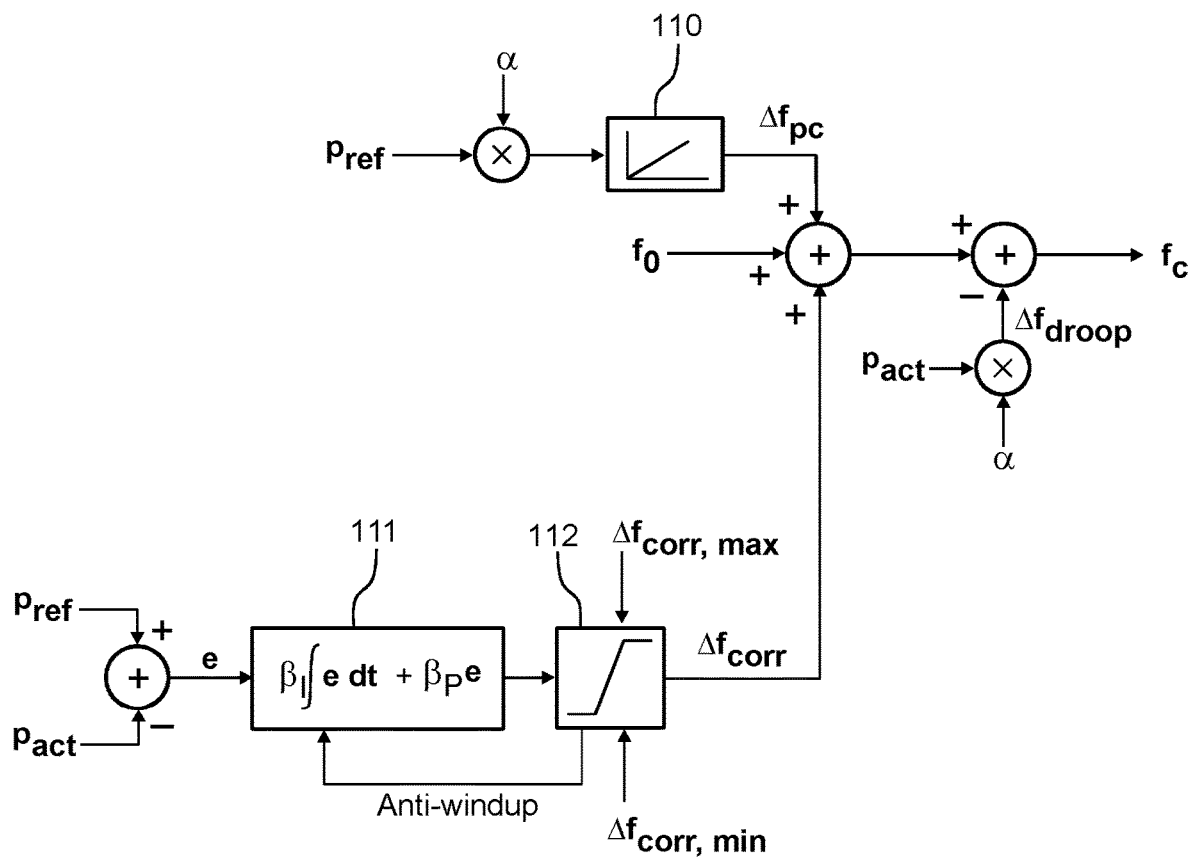
FIG. 1c illustrates a control device according to another exemplifying and non-limiting embodiment.

FIG. 1c shows a signal diagram of a control device according to an exemplifying and non-limiting embodiment for determining the above-mentioned frequency control value $f_c$. In this exemplifying case, the data processing system of the control device is configured to compute a time integral of an error value e that is proportional to a difference between the target value $p_{ref}$ of the electric power and the actual electric power $p_{act}$. The data processing system is configured to correct the frequency control value with a correction value $\Delta f_{corr}$ that is dependent on the time integral of the error value. The time integral is changing as long as the actual electric power $p_{act}$ differs from the target value $p_{ref}$. Thus, in a steady state where the time integral does not substantially change, the actual electric power $p_{act}$ is substantially equal to the target value $p_{ref}$ and the correction value $\Delta f_{corr}$ compensates for the difference between the base value $f_0$ and the real operating frequency of the AC system 114.

In a control device according to an exemplifying and non-limiting embodiment, the data processing system is configured to form the frequency control value $f_c$ according to the following formulas:

$$f_c = f_0 - \Delta f_{droop} + \Delta f_{pc} + \Delta f_{corr}, \quad (7)$$

$$\Delta f_{droop} = \alpha p_{act}, \quad (8)$$

$$\Delta f_{pc} = \alpha p_{ref}, \text{ and} \quad (9)$$

$$\Delta f_{corr} = \beta_I \int (p_{ref} - p_{act})dt + \beta_P(p_{ref} - p_{act}), \quad (10)$$

where $\beta_I$ and $\beta_P$ are control parameters. The above-mentioned formula 10 represents a proportional and integrative "PI" controller. The control parameters $\beta_I$ and $\beta_P$ can be for example:

$\beta_P = \alpha g$, and $\beta_I = \alpha / T_I$, where g is a gain coefficient and $T_I$ is an integration time. As presented earlier in formula 4, the drooping coefficient α can be for example $k_{droop} f_{nom}/p_{nom}$. In FIG. 1c, the PI controller is depicted with a controller block 111. It is also possible that g is zero and thereby the controller block 111 is a mere integrative controller.

In a control device according to an exemplifying and non-limiting embodiment, the data processing system is configured to limit the correction value $\Delta f_{corr}$ to be at least a predetermined lower limit $\Delta f_{corr,min}$ and at most a predetermined upper limit $\Delta f_{corr,max}$. In FIG. 1c, the limitation of the correction value $\Delta f_{corr}$ is depicted with a limiter block 112. The data processing system is advantageously configured to implement an anti-windup functionality that prevents an absolute value of the above-mentioned time integral from increasing in response to a situation in which the correction value $\Delta f_{corr}$ reaches the above-mentioned upper limit $\Delta f_{corr,max}$ or the above-mentioned lower limit $\Delta f_{corr,min}$.

The above-described limitation of the correction value $\Delta f_{corr}$ may become active in situations where the AC grid 108 shown in FIG. 1a is cut off and the power converter 109 is left alone to feed the AC microgrid 107 that is an island grid after the cut off. For example, if the power converter 109 was operating with a negative target value $p_{ref}$ of the electric power e.g. charging a battery of the DC system 105, the cutting off the AC grid 108 makes the drooping feedback to decrease the alternating voltage frequency of the power converter 109 because the electric power $p_{act}$ cannot be negative any more i.e. the power converter 109 cannot receive electric power from the AC system 114 and thus the electric power, as a signed quantity, increases after the cut off. The decrease in the alternating voltage frequency cannot however drive the electric power $p_{act}$ to meet the negative target value because the AC grid 108 is not connected anymore. Thus the difference $p_{ref} - p_{act}$ stays negative and the correction value $\Delta f_{corr}$ decreases until it meets its lower limit $\Delta f_{corr,min}$. Thereafter, the alternating voltage frequency is $f_0 + \Delta f_{corr,min} + \alpha p_{ref} - \alpha p_{act}$ and the power converter 109 feeds the loads connected to the AC microgrid 107.

The implementation of the data processing system 102 shown in FIG. 1a can be based on one or more analogue circuits, one or more digital processing circuits, or a combination thereof. Each digital processing circuit can be a programmable processor circuit provided with appropriate software, a dedicated hardware processor such as for example an application specific integrated circuit "ASIC", or a configurable hardware processor such as for example a field programmable gate array "FPGA". Furthermore, the data processing system 102 may comprise one or more memory circuits each of which can be for example a random-access memory "RAM" circuit.

Figure 2:
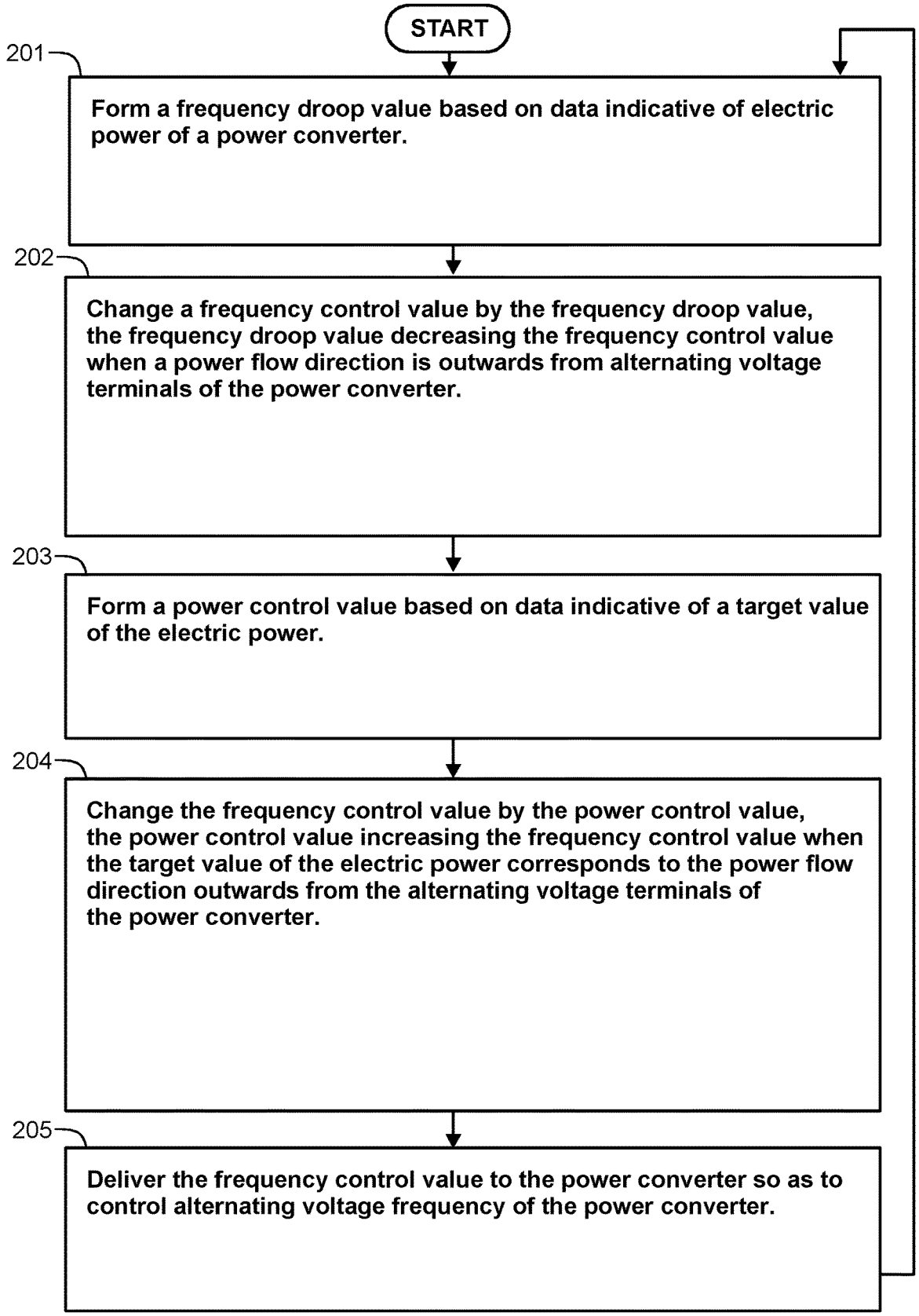
FIG. 2 shows a flowchart of a method according to an exemplifying and non-limiting embodiment for controlling a power converter.

FIG. 2 shows a flowchart of a method according to an exemplifying and non-limiting embodiment for controlling a power converter. The method comprises the following actions:

- action 201: forming a frequency droop value based on data indicative of electric power of the power converter, and
- action 202: changing a frequency control value by the frequency droop value, the frequency droop value decreasing the frequency control value when a power flow direction is outwards from alternating voltage terminals of the power converter,
- action 203: forming a power control value based on data indicative of a target value of the electric power,
- action 204: changing the frequency control value by the power control value, the power control value increasing the frequency control value when the target value of the electric power corresponds to the power flow direction outwards from the alternating voltage terminals of the power converter, and
- action 205: delivering the frequency control value to the power converter so as to control alternating voltage frequency of the power converter.

In a method according to an exemplifying and non-limiting embodiment, the frequency control value is formed according to the following formulas:

$$f_c = f_0 - \Delta f_{droop} + \Delta f_{pc},$$

$$\Delta f_{droop} = \alpha p_{act}, \text{ and}$$

$$\Delta f_{pc} = \alpha p_{ref},$$

where $f_c$ is the frequency control value, $f_0$ is a base value of the frequency control value, $p_{act}$ is the electric power of the power converter, $\Delta f_{droop}$ is the frequency droop value, $p_{ref}$ is the target value of the electric power, $\Delta f_{pc}$ is the power control value, and $\alpha$ is a drooping coefficient for changing the frequency control value in accordance with the electric power.

A method according to an exemplifying and non-limiting embodiment comprises limiting a rate of change of the power control value to be at most a predetermined upper limit of the rate of change.

A method according to an exemplifying and non-limiting embodiment comprises computing a time integral of an error value proportional to a difference between the target value of the electric power and the electric power, and correcting the frequency control value with a correction value dependent on the time integral of the error value.

In a method according to an exemplifying and non-limiting embodiment, the frequency control value is formed according to the following formulas:

$$f_c = f_0 - \Delta f_{droop} + \Delta f_{pc} + \Delta f_{corr},$$

$$\Delta f_{droop} = \alpha p_{act},$$

$$\Delta f_{pc} = \alpha p_{ref}, \text{ and}$$

$$\Delta f_{corr} = \beta_I \int (p_{ref} - p_{act}) dt,$$

where $\Delta f_{corr}$ is the correction value and $\beta_I$ is a control parameter.

In a method according to an exemplifying and non-limiting embodiment, the error value, e.g. $p_{ref} - p_{act}$, is an input value of a proportional and integrative controller and the correction value is an output value of the proportional and integrative controller.

A method according to an exemplifying and non-limiting embodiment comprises limiting the correction value to be at least a predetermined lower limit of the correction value and at most a predetermined upper limit of the correction value.

A method according to an exemplifying and non-limiting embodiment comprises preventing an absolute value of the above-mentioned time integral from increasing in response to a situation in which the correction value reaches the predetermined upper limit of the correction value or the predetermined lower limit of the correction value.

A method according to an exemplifying and non-limiting embodiment comprises forming a voltage droop value based on data indicative of reactive power of the power converter. The voltage droop value decreases an amplitude of voltage of the power converter in response to a situation in which the power converter produces inductive reactive power. Correspondingly, the voltage droop value increases the amplitude of the voltage of the power converter in response to a situation in which the power converter consumes inductive reactive power.

A computer program according to an exemplifying and non-limiting embodiment comprises computer executable instructions for controlling a programmable processing system to carry out actions related to a method according to any of the above-described exemplifying and non-limiting embodiments.

A computer program according to an exemplifying and non-limiting embodiment comprises software modules for controlling a power converter. The software modules comprise computer executable instructions for controlling a programmable processing system to:

- form a frequency droop value based on data indicative of electric power of the power converter, and
- change a frequency control value by the frequency droop value, the frequency droop value decreasing the frequency control value when a power flow direction is outwards from alternating voltage terminals of the power converter,
- form a power control value based on data indicative of a target value of the electric power,
- change the frequency control value by the power control value, the power control value increasing the frequency control value when the target value of the electric power corresponds to the power flow direction outwards from the alternating voltage terminals of the power converter, and
- deliver the frequency control value to the power converter so as to control alternating voltage frequency of the power converter.

The software modules can be for example subroutines or functions implemented with programming tools suitable for the programmable processing system.

A computer program product according to an exemplifying and non-limiting embodiment comprises a computer readable medium, e.g. a compact disc "CD", encoded with a computer program according to an exemplifying embodiment of invention.

A signal according to an exemplifying and non-limiting embodiment is encoded to carry information defining a computer program according to an exemplifying embodiment of invention.

The specific examples provided in the description given above should not be construed as limiting the scope and/or the applicability of the appended claims. Lists and groups of examples provided in the description given above are not exhaustive unless otherwise explicitly stated.

What is claimed is:

1. A control device for controlling a power converter, the control device comprising a data processing system configured to:
    form a frequency droop value ($\Delta f_{drop}$) based on data ($U_{DC}$, $I_{DC}$) indicative of electric power ($p_{act}$) of the power converter, and
    change a frequency control value ($f_c$) by the frequency droop value, the frequency droop value decreasing the frequency control value when a power flow direction is outwards from alternating voltage terminals of the power converter,
wherein the data processing system is configured to:
    form a power control value ($\Delta f_{pc}$) based on data indicative of a target value ($p_{ref}$) of the electric power,
    change the frequency control value by the power control value, the power control value increasing the frequency control value when the target value of the electric power corresponds to the power flow direction outwards from the alternating voltage terminals of the power converter,
    deliver the frequency control value to the power converter so as to control alternating voltage frequency of the power converter,
    compute a time integral of an error value proportional to a difference ($p_{ref}-p_{act}$) between the target value of the electric power and the electric power,
    correct the frequency control value with a correction value ($\Delta f_{corr}$) dependent on the time integral of the error value, and
    limit the correction value to be at least a predetermined lower limit of the correction value and at most a predetermined upper limit of the correction value.

2. The control device according to claim 1, wherein the data processing system is configured to form the frequency control value according to the following formulas:

$$f_c = f_0 - \Delta f_{droop} + \Delta f_{pc},$$

$$\Delta f_{droop} = \alpha p_{act}, \text{ and}$$

$$\Delta f_{pc} = \alpha p_{ref}$$

where $f_c$ is the frequency control value, $f_0$ is a base value of the frequency control value, $p_{act}$ is the electric power of the power converter, $\Delta f_{droop}$ is the frequency droop value, $p_{ref}$ is the target value of the electric power, $\Delta f_{pc}$ is the power control value, and $\alpha$ is a drooping coefficient for changing the frequency control value in accordance with the electric power.

3. The control device according to claim 1, wherein the data processing system is configured to limit a rate of change of the power control value ($\Delta f_{pc}$) to be at most a predetermined upper limit of the rate of change.

4. The control device according to claim 1, wherein the data processing system is configured to form the frequency control value according to the following formulas:

$$f_c = f_0 - \Delta f_{droop} + \Delta f_{pc} + \Delta f_{corr},$$

$$\Delta f_{droop} = \alpha p_{act},$$

$$\Delta f_{pc} = \alpha p_{ref}, \text{ and}$$

$$\Delta f_{corr} = \beta_I (p_{ref} - p_{act}) dt,$$

where $f_c$ is the frequency control value, $f_0$ is a base value of the frequency control value, $p_{act}$ is the electric power of the power converter, $\Delta f_{droop}$ is the frequency droop value, $p_{ref}$ is the target value of the electric power, $\Delta f_{pc}$ is the power control value, $\Delta f_{corr}$ is the correction value, $\alpha$ is a drooping coefficient for changing the frequency control value in accordance with the electric power, and $\beta_I$ is a control parameter.

5. The control device according to claim 1, wherein the data processing system is configured to constitute a proportional and integrative controller, and the error value is an input value of the proportional and integrative controller and the correction value is an output value of the proportional and integrative controller.

6. The control device according to claim 1, wherein the data processing system is configured to prevent an absolute value of the time integral from increasing in response to a situation in which the correction value reaches the predetermined upper limit of the correction value or the predetermined lower limit of the correction value.

7. The control device according to claim 1, wherein the data processing system is configured to form a voltage droop value ($\Delta u_{droop}$) based on data indicative of reactive power (Q) of the power converter, the voltage droop value decreasing an amplitude of voltage of the power converter in response to a situation in which the power converter produces inductive reactive power.

8. A power converter comprising:
    a converter stage configured to form one or more alternating voltages, and
    a driver stage configured to control the converter stage to form the one or more alternating voltages in accordance with a frequency control value ($f_c$) expressing frequency of the one or more alternating voltages, and
    a control device configured to determine the frequency control value,
wherein the control device comprising a data processing system configured to:
    form a frequency droop value ($\Delta f_{droop}$) based on data ($U_{DC}$, $I_{DC}$) indicative of electric power ($p_{act}$) of the power converter, and
    change the frequency control value ($f_c$) by the frequency droop value, the frequency droop value decreasing the frequency control value when a power flow direction is outwards from alternating voltage terminals of the power converter,
wherein the data processing system is configured to:
    form a power control value ($\Delta f_{pc}$) based on data indicative of a target value ($p_{ref}$) of the electric power,
    change the frequency control value by the power control value, the power control value increasing the frequency control value when the target value of the electric power corresponds to the power flow direction outwards from the alternating voltage terminals of the power converter, and
    deliver the frequency control value to the power converter so as to control alternating voltage frequency of the power converter,
    compute a time integral of an error value proportional to a difference ($p_{ref}-p_{act}$) between the target value of the electric power and the electric power, correct the frequency control value with a correction value ($\Delta f_{corr}$) dependent on the time integral of the error value, and limit the correction value to be at least a predetermined lower limit of the correction value and at most a predetermined upper limit of the correction value.

9. The power converter according to claim 8, wherein the driver stage is configured to control the converter stage to form the one or more alternating voltages in accordance with the frequency control value ($f_c$) and a voltage control value ($U_c$), and the control device is a control device and configured to determine the voltage control value.

10. A method for controlling a power converter, the method comprising:

forming a frequency droop value ($\Delta f_{droop}$) based on data indicative of electric power ($p_{act}$) of the power converter, and changing a frequency control value ($f_c$) by the frequency droop value, the frequency droop value decreasing the frequency control value when a power flow direction is outwards from alternating voltage terminals of the power converter, wherein the method further comprises:

forming a power control value ($\Delta f_{pc}$) based on data indicative of a target value ($p_{ref}$) of the electric power, changing the frequency control value by the power control value, the power control value increasing the frequency control value when the target value of the electric power corresponds to the power flow direction outwards from the alternating voltage terminals of the power converter, delivering the frequency control value to the power converter so as to control alternating voltage frequency of the power converter, computing a time integral of an error value proportional to a difference ($p_{ref}-p_{act}$) between the target value of the electric power and the electric power, correcting the frequency control value with a correction value ($\Delta f_{corr}$) dependent on the time integral of the error value, and limiting the correction value to be at least a predetermined lower limit of the correction value and at most a predetermined upper limit of the correction value.

11. The method according to claim 10, wherein the method comprises computing a time integral of an error value proportional to a difference ($p_{ref}-p_{act}$) between the target value of the electric power and the electric power, and to correct the frequency control value with a correction value ($\Delta f_{corr}$) dependent on the time integral of the error value.

12. A computer program for controlling a power converter, the computer program comprising computer executable instructions for controlling a programmable processing system to:

form a frequency droop value ($\Delta f_{droop}$) based on data indicative of electric power ($p_{act}$) of the power converter, and change a frequency control value ($f_c$) by the frequency droop value, the frequency droop value decreasing the frequency control value when a power flow direction is outwards from alternating voltage terminals of the power converter, wherein the computer program comprises computer executable instructions for controlling the programmable processing system to:

form a power control value ($\Delta f_{pc}$) based on data indicative of a target value ($p_{ref}$) of the electric power, change the frequency control value by the power control value, the power control value increasing the frequency control value when the target value of the electric power corresponds to the power flow direction outwards from the alternating voltage terminals of the power converter, deliver the frequency control value to the power converter so as to control alternating voltage frequency of the power converter, compute a time integral of an error value proportional to a difference ($p_{ref}-p_{act}$) between the target value of the electric power and the electric power, correct the frequency control value with a correction value ($\Delta f_{corr}$) dependent on the time integral of the error value, and limit the correction value to be at least a predetermined lower limit of the correction value and at most a predetermined upper limit of the correction value.

13. A non-volatile computer readable medium encoded with a computer program according to claim 12.

14. The control device according to claim 2, wherein the data processing system is configured to limit a rate of change of the power control value ($\Delta f_{pc}$) to be at most a predetermined upper limit of the rate of change.

15. The control device according to claim 4, wherein the data processing system is configured to constitute a proportional and integrative controller, and the error value is an input value of the proportional and integrative controller and the correction value is an output value of the proportional and integrative controller.

* * * * *

UNITED STATES PATENT AND TRADEMARK OFFICE
CERTIFICATE OF CORRECTION

PATENT NO. : 11,831,231 B2
APPLICATION NO. : 17/182612
DATED : November 28, 2023
INVENTOR(S) : Summanen et al.

It is certified that error appears in the above-identified patent and that said Letters Patent is hereby corrected as shown below:

In the Claims

Column 14, Line 6, Claim 4, fourth formula, should read: "$\Delta f_{corr} = \beta_I \int (p_{ref} - p_{act})\, dt,$".

Signed and Sealed this
Ninth Day of April, 2024

Katherine Kelly Vidal
*Director of the United States Patent and Trademark Office*